United States Patent

Saraceno et al.

[15] 3,664,950

[45] May 23, 1972

[54] PROCESS FOR SELECTIVE REMOVAL AND RECOVERY OF CHROMATES FROM WATER

[72] Inventors: Anthony J. Saraceno, Chillicothe; Reed H. Walters, Waverly; Donald B. Jones, Chillicothe; William E. Wiehle, Portsmouth, all of Ohio

[73] Assignee: The United States of America as represented by the United States Atomic Energy Commission

[22] Filed: June 23, 1970

[21] Appl. No.: 49,102

[52] U.S. Cl. .................................................210/35, 210/37
[51] Int. Cl. ..........................................................B01d 15/04
[58] Field of Search .........................................210/30, 35, 37

[56] References Cited

UNITED STATES PATENTS

| | | | |
|---|---|---|---|
| 3,223,620 | 12/1965 | Oberhofer | 210/30 |
| 3,306,859 | 2/1967 | Sloan et al. | 210/37 X |
| 3,414,510 | 12/1968 | Oberhofer | 210/37 |

FOREIGN PATENTS OR APPLICATIONS 230,587  6/1960  Australia ...............................210/35

Primary Examiner—Samih N. Zaharna
Attorney—Roland A. Anderson

[57] ABSTRACT

An improved anion-exchange process for the removal and recovery of trace quantities of chromates from water. The process utilizes a bed of basic anion-exchange resin and the combination of upflow exhaustion of the chromates from the water and downflow regeneration of the resin. Efficient recovery of chromates is accomplished while virtually eliminating chromate leakage during the initial portion of the exhaustion operation. Regeneration can be accomplished without the use of strong, expensive chemicals.

10 Claims, 2 Drawing Figures

Patented May 23, 1972

INVENTORS.
Anthony J. Saraceno
Reed H. Walters
Donald B. Jones
William E. Wiehle

BY

ATTORNEY.

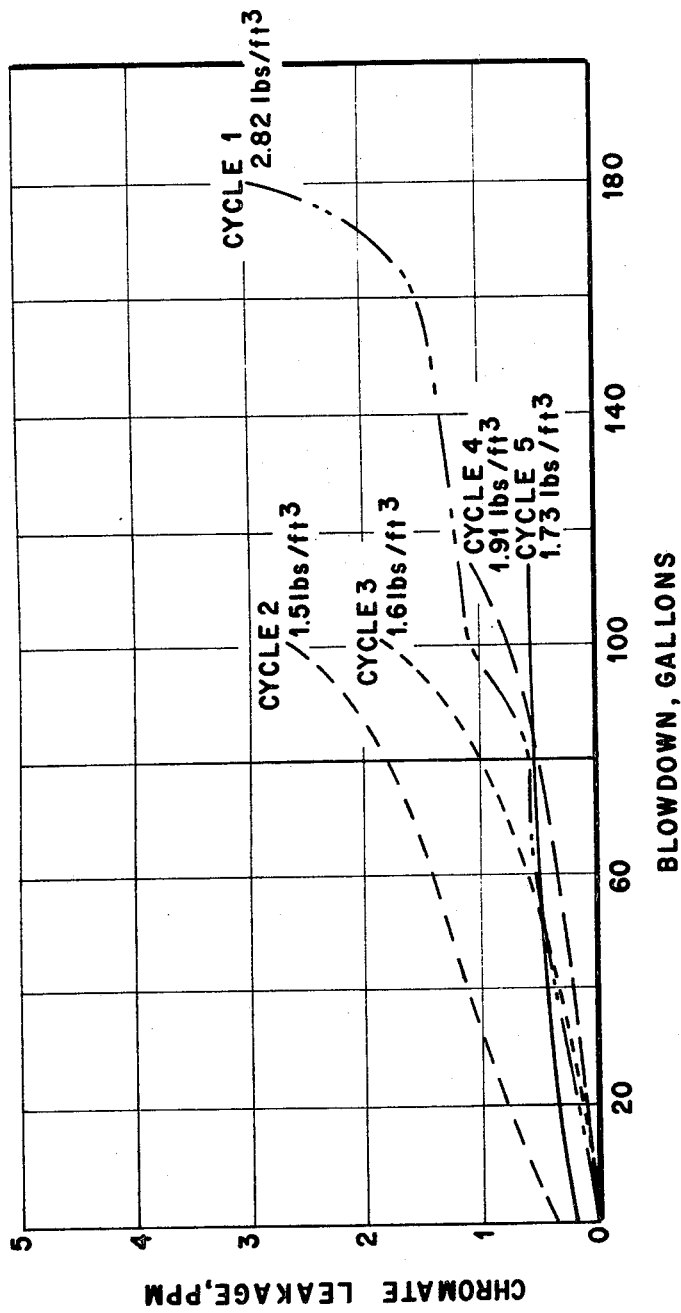

PROCESS FOR SELECTIVE REMOVAL AND RECOVERY OF CHROMATES FROM WATER

BACKGROUND OF THE INVENTION

This invention was made in the course of, or under, a contract with the United States Atomic Energy Commission.

This invention relates to an improved process for the removal and recovery of chromates—i.e., hexavalent chromium compounds—from water containing the same. The invention is generally applicable to chromate removal and recovery, but for convenience will be illustrated herein in terms of a specific industrial use where it provides important advantages, this use being the removal and recovery of chromates from blowdown water discharged from industrial cooling systems of the kind wherein heat is transferred to water, the water then being cooled by passage through cooling towers and recirculated.

Water available for industrial use often is high in dissolved solids and may be corrosive. To render such water less corrosive for use as a recirculating coolant, it is common to add chromate ions to the water in the form of hexavalent chromium compounds, such as alkali metal chromates. When this water is passed through cooling towers, some of it is lost through evaporation and windage. This loss is reflected in a buildup in the concentration of dissolved solids in the system. Consequently, whenever this concentration reaches a selected level it is customary to blow down the system by discharging a fraction of the water therein and replacing this blowdown fraction with makeup water containing a lower concentration of dissolved solids.

It is desirable to process cooling system blowdown to recover the chromate therein before discharging the blowdown to holding ponds, streams, or sewers. The blowdown from a cooling tower system typically contains about 15–50 ppm chromate and about 500–2000 ppm dissolved solids such as metal phosphates, sulphates, and carbonates. In some instances, blowdown contains as much as 500 ppm chromate. (Where chromate concentrations are referred to herein they are expressed as $CrO_4$.) Thus, when appreciable quantities of blowdown are involved it is economically attractive to recover the expensive chromate for re-use as a corrosion inhibitor. The economies attending the recovery of chromates from cooling tower blowdown increase with the size of the cooling system, and as is well known could be large in the case of plants on the scale of the United States gaseous diffusion plants for the separation of uranium isotopes.

Even if re-use of the above-mentioned chromate were not a consideration, its removal from blowdown often is necessary in order to meet local regulations on the content of materials discharged to sewers and streams. Proposed Federal, State, or local regulations for restricting pollution may limit the chromate content of discharged waters to as little as 2 ppm, and the present general trend appears to be toward still lower permissible maximum concentrations, such as a limit of 0.1 ppm for drinking water.

Because of the incentives mentioned above, the removal of chromates from water has been studied intensively by many investigators. Through the years, anion-exchange processes have been developed for such recovery. Some of these processes—for example, those described in U.S. Pat. Nos. 3,223,620, 3,306,859, and 3,414,510—have been described specifically in terms of the recovery of chromates from blowdown water.

All of the known prior processes for the recovery of chromate from water by anion exchange are conducted in at least two steps, an exhaustion step and a regeneration step. In the exhaustion step, it is the practice to pass the chromate-containing water (e.g., blowdown) downwardly through a bed of a basic anion-exchange resin to selectively absorb the chromate ions on the resin, where they are retained. In the course of this exhaustion step, the total ion-exchange capacity of the bed is reduced, perhaps to the point where the bed is essentially saturated with respect to chromate. In the subsequent regeneration step, an alkaline solution is passed either upwardly or downwardly through the bed to remove chromate from the resin, thus restoring the ion-exchange capacity of the bed to at least a part of its original value.

Unfortunately, the prior-art anion-exchange processes for recovering chromate from water are subject to various disadvantages. For example, they employ costly regenerating chemicals which, because of their strongly alkaline nature, reduce the life of the anion-exchange resin. Even more important, the prior-art processes do not consistently reduce the chromate content of the input water to less than about 3 ppm.

SUMMARY OF THE INVENTION

It is an object of this invention to provide a more economical anion-exchange process for the recovery of chromates from chromate-treated water. Another object of the invention is to provide an anion-exchange process for consistently reducing the chromate content of cooling system waste water to less than 2 ppm in a single pass of the water through an ion-exchange column and under conditions promoting long life of the resin. It is another object to provide an anion-exchange process for reducing the chromate content of chromate-treated water to 0.1 ppm or less. Other objects of this invention will be apparent hereinafter.

The objects of this invention are achieved by utilizing our discovery that the recovery of chromate from water by anion exchange is unexpectedly and significantly improved by utilizing the combination of upflow exhaustion of the chromate from the water and downflow regeneration of the anion-exchange resin. Basically, our invention is conducted by adjusting the pH of the chromate-containing water to within the range of about 3–5.5. The pH-adjusted water is then passed upwardly through a bed of a basic anion-exchange resin to selectively remove the chromates and retain them on the resin. When the chromate loading of the bed reaches a selected value or the chromate concentration in the effluent water reaches a specified maximum, the exhaustion operation is stopped. Subsequently, the chromate-retaining resin is regenerated to a selected degree by passing downwardly through the bed an alkaline aqueous solution which contains regenerant anions. The regenerant solution leaving the column contains the eluted chromate and, being low in dissolved solids, can be returned to the process system for re-use as a corrosion inhibitor.

One of the applications in which this invention can be used to advantage is the removal and recovery of chromates from blowdown waters of the kind referred to above, where the chromate concentration typically exceeds 15 ppm but is small compared to the total concentration of dissolved solids.

BRIEF DESCRIPTION OF THE DRAWINGS

FIG. 2 is a graph correlating chromate leakage and water throughput for each of five successive chromate-recovery cycles conducted in accordance with this invention.

DESCRIPTION OF THE PREFERRED EMBODIMENT

Figure 1:
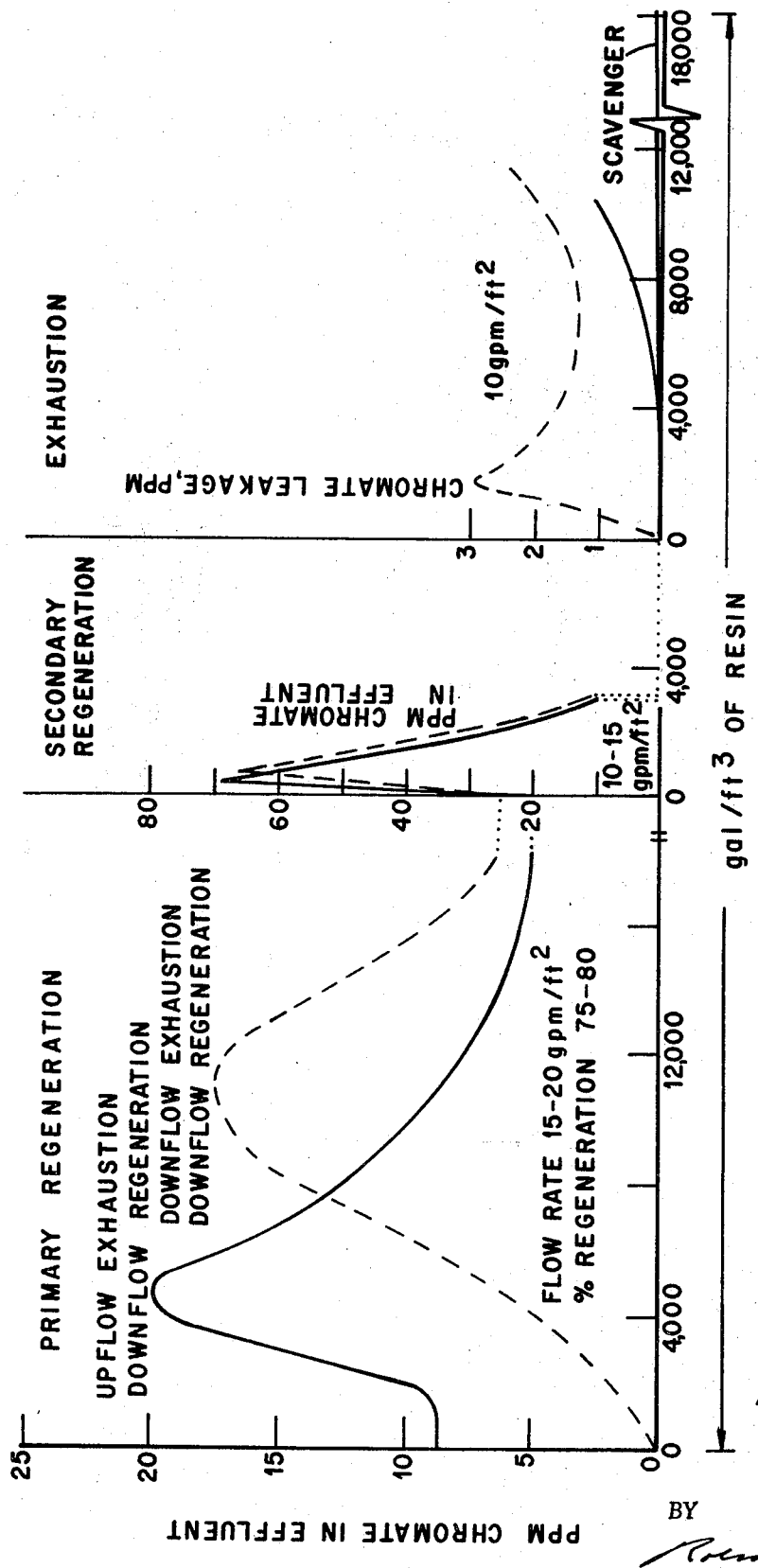
FIG. 1 is a graph correlating data obtained in two chromate-recovery cycles conducted in identical systems, one of the cycles being conducted in accordance with this invention and the other in accordance with the prior art.

Our invention will be illustrated below in terms of a specific industrial application, the recovery of chromates from the blowdown from a recirculating-water system for a gaseous diffusion plant. A typical analysis for this blowdown is given below, together with a typical analysis of the makeup water (line-softened well water) periodically added to the cooling-water system to compensate for removal of the blowdown.

TABLE I

| | Blowdown: Concentration | Makeup: Concentration |
| --- | --- | --- |

| Ion | (ppm) | (ppm) |
|---|---|---|
| Calcium (as CaCO$_3$) | 330 | 40 |
| Magnesium (as CaCO$_3$) | 780 | 91 |
| Sulfates (SO$_4$) | 760 | 85 |
| Chlorides (Cl) | 186 | 25 |
| Silica (SiO$_2$) | 110 | 9 |
| Phosphates, total (PO$_4$) | 2.3 | 0 |
| Chromate (CrO$_4$) | 21 | 0 |
| Zinc (Zn) | 1.8 | 0 |
| Copper (Cu) | 0.03 | 0 |
| Oil-like Material | 7.2 | 0 |
| Specific Conductance (micromhos) | 1800 | 260 |
| pH | 6.0 | 9.9 |
| Temperature (°F.) | 85–105 | 52–60 |

In applying our invention to the recovery of chromate from the blowdown just described, the recovery operation can be conducted with a vertical column of standard design having resin-retaining screens at both the upper and lower ends. The column contains a bed of a strongly basic anion-exchange resin which can be one of a wide variety of such resins—such as Dowex SBR-1 (Dow Chemical Company), IRA-400 (Rohm & Haas Company), Duolite A-101 (Chemical Process Co.,), or Permutit (S-1) (Permutit, Inc.).

In a typical operation, the blowdown to be processed is passed through a standard microporous filter to remove suspended matter. After adjustment to a pH ensuring selective exchange of chromate ions, the blowdown is passed upwardly through the resin column to remove chromates therefrom. Following this exhaustion step, the column is regenerated in successive primary and secondary operations. In the primary regeneration operation, process makeup water (see Table I) is passed downwardly through the column; the secondary operation comprises recycling downwardly through the column a part of the ordinarily discarded blowdown effluent from the exhaustion step. After the secondary regenerating operation for the column, unprocessed blowdown is again passed upwardly through the column to initiate a second exhaustion step. In succeeding cycles, the resin bed is acrid-rinsed just prior to the exhaustion step to quickly satisfy the affinity of the resin bed for acid and thus reduce chromate leakage rates during the initial part of the following exhaustion step. Periodically (e.g., every two or three cycles), just prior to the acrid-rinse step, pH-adjusted makeup water is passed upwardly through the bed to expand it and wash away any foreign matter accumulating therein.

An anion-exchange column was operated as just described for five successive cycles to recover chromate from blowdown of the composition shown in Table I. The flow rate for the exhaustion steps was maintained at a value slightly above that required to lift the bed and displace it against the upper screen; this ensured that a large volume of the compacted resin was contacted by a unit volume of water. The following is a summary of the process parameters.

TABLE II

Column:
  Height ............ 72 inches
  Diameter .......... 16 inches
  Bed depth, compacted ..... 42 inches
  Anion-exchange resin ..... IRA-400

| Column operation | Flow density, g.p.m./ft.$^2$ | Temperature, °F. | pH | Duration, days |
|---|---|---|---|---|
| Upflow exhaustion | 10 | 85–105 | 4.0–5.0 | 4 |
| Downflow primary regeneration | 20 | 52–60 | 9.8–10.1 | 4 |
| Downflow secondary regeneration | 10 | 85–105 | 4.0–5.0 | <0.5 |
| Back wash (each 2–3 cycles) | 1–3 | 52–60 | 9.8–10.1 | |
| Downflow acid rinse | 2–3 | (¹) | 2.5% H$_2$SO$_4$ | |

¹ Ambient.

FIG. 1 correlates chromate leakage and blowdown throughput for a recovery cycle conducted in the system referred to in Table II and under the conditions summarized therein. For comparison, FIG. 1 also presents the same kind of correlation for a prior-art chromate-recovery process conducted in an identical system and under the same conditions, with the exception that the exhaustion and regeneration operations were conducted in the downward direction. It will be noted that in the primary and secondary regenerations (although the curves are slightly displaced), both processes yield essentially 75 percent regeneration with equal amounts of regenerant. In the following exhaustion cycle, however, chromate leakage incurred with the prior-art method rapidly increases to 3 ppm, making that method unacceptable for pollution prevention. As indicated in that part of FIG. 1 relating to the exhaustion operation, a scavenger ion-exchange column was connected to receive the effluent from the column operated in accordance with this invention. The scavenger column was identical to that referred to in Table II. As indicated, even after 18,000 gallons of effluent had passed through each cubic foot of the scavenger bed, the scavenger output stream contained less than 0.1 ppm chromate. Thus, our invention permits efficient recovery of chromates while limiting initial chromate leakage to nearly zero. This is a marked contrast to conventional exhaustion-regeneration processes for recovering chromate, since they are characterized by comparatively high chromate leakage during the first part of the exhaustive cycle.

The exhaustion portion of our process can be continued until a predetermined concentration of chromate begins breaking through the resin bed; then the regeneration cycle is initiated. Our process does not necessitate the use of strong or expensive chemical regenerants, such as caustic or salt solutions. Instead, regeneration can be accomplished efficiently with mildly basic makeup water or the like and with part of the normally discarded chromate-free water effluent from the exhaustion step. Neither does our process require 100 percent bed regeneration to restrict initial chromate leakages to very low values. Use of less than the full ion-exchange capacity of the resin bed is economically permissible because the elimination of expensive regenerants frees us from the necessity of saturating a large fraction of the resin during the exhaustion step in order to achieve low-cost operation. Elimination of strong chemical regenerants also greatly extends the operating life of the expensive resin.

Our improved chromate-recovery process is not limited to the system referred to in Table II or to the particular regenerants mentioned in connection therewith. It can, in fact, be advantageously substituted for conventional chromate-recovery processes in most of the applications where they are used. The superiority of our chromate-recovery process is due primarily to the use in combination of upflow exhaustion and downflow regeneration. This advantage is maximized when only the exhaustion steps and the bed-washing steps (if any) are conducted upflow and all other flows through the bed are conducted downflow.

Conventional anion-exchange processes for chromate recovery utilize downflow exhaustion in combination with either upflow or downflow regeneration. Downflow exhaustion, the standard mode of operation, would appear to be preferable over upflow exhaustion because the latter requires appreciably higher water velocities to overcome the weight of the bed. These higher water velocities are reflected in higher pumping costs and would be expected to result in higher chromate leakage since, other things equal, leakage ordinarily increases with water velocity. We have found, however, that the combination of upflow exhaustion and downflow regeneration significantly reduces initial chromate leakage (FIG. 1) and provides various other advantages (to be described), with the surprising result that a significant gain is achieved compared with the prior art.

The basic deficiency of downflow exhaustion for chromate recovery is due to an effect which we first noted during observation of a glass column containing a bed of a strongly basic anion-exchange resin through which water, containing a very high concentration of chromate, has been passed downwardly, forming a chromate-rich band at the inlet end of the bed. This layer, which was a dark-red color, began to move downwardly through the bed when backwashing of the resin was initiated by passing wash water upward through the bed in the conventional manner. As the bed expansion increased, the chromate-rich band sank more rapidly. After backwashing was terminated and the chromate-laden resin particles has settled by gravity, it was observed that the red band now comprised the lowermost section of the bed. This finding led to additional experiments which confirmed that if the resin bed is expanded following downflow exhaustion, the chromate-laden particles, which initially were concentrated in the upper portion of the bed, migrate to or toward the bottom portion because of their comparatively high density. Because of this density effect, essentially no segment of the bed remains chromate-free; thus, chromate leakage cannot be kept extremely low in a process utilizing downflow exhaustion and backwashing. Furthermore, regeneration in such processes is made more difficult and more costly because the chromate—being dispersed through out the bed as well as concentrated in the bottom portion thereof—must be entirely removed before another exhaustion cycle, in order to obtain low leakage rates. (The downward migration of chromate-laden resin particles from the top of the resin column can occur not only during backwashing operations but whenever the resin bed is expanded or mildly agitated. Thus, migration can occur whenever the flow of liquid upwardly through the bed reaches fluidizing velocity and whenever the upflow through the column is reduced below the value necessary for compressing the bed against the upper screen.)

The more important advantages attending the use of the combination of upflow exhaustion and downflow regeneration are summarized below. These advantages are not obtained by using other directions of flow, in whatever order they may be executed.

1. Upflow exhaustion permits concentration of the chromate in a narrow band at the base of the column, to which resin particles containing the greatest amount of chromate will tend to migrate gravitationally;
2. Upflow exhaustion permits concentration of the cleanest (chromate-free) resin particles in a region at the top of the column where they can scavenge chromate breaking through the lower portion of the bed. This concentration of the cleanest resin particles is a consequence of the lower density of those particles containing the the least amount of chromate;
3. The chromate-laden particles and the large-diameter chromate-free particles migrate to the bottom of the bed, so that the concentration gradient of chromate and the particle size of the resin beads both decrease from the bottom to the top of the bed. This means that the resin particles containing the least amount of chromate also comprise the finest particles of resin. Since control of leakage largely is determined by the low chromate concentration at the outlet (upper) end of the bed, this particle-size and concentration distribution of the chromate on the resin is most favorable to controlling leakage during each subsequent exhaustion cycle;
4. The downflow regeneration procedure supplements the excellent leakage control for subsequent exhaustion cycles, even if the resin bed is not completely regenerated, since the elution is directed towards the high-chromate containing section (bottom) and away from the cleanest portion (top) of the column bed. The latter is regenerated at a faster rate and can function well as the leakage-controlling segment of the bed even though the column as a whole may contain as much as 25 percent of the chromate from the preceding cycle;
5. Long-term degradation and physical fouling of the resin normally begin at the end portion of the resin which first comes into contact with the chromate-containing influent. In upflow exhaustion, therefore, the largest resin particles will be degraded first, leaving the finer resin particles as the more valuable component for leakage control; and
(6.) Upflow exhaustion may reduce or even eliminate the usual filtration operations employed in ion-exchange processes for chromate recovery. Tests of our process indicate that physical fouling by suspended matter in the blowdown occurs in the least operationally sensitive part of the bed, which is also the point where the large resin particles migrate. This segment of the bed is not functionally valuable for low leakage operation. Bed expansion, such as that accompanying the start of the exhaustion operation, allows the accumulated suspended matter to be blown through the bed with no complications.

For brevity, we have discussed our process as conducted in a single column. It will be apparent, however, that the above-mentioned advantages will be obtained where our process is conducted in a plurality of parallel-connected columns to achieve substantial increases in volume capacity. Preferably, operation of the parallel columns is staggered to effect chromate recovery in some columns while others are being regenerated. The roles of the columns subsequently can be reversed to provide continuous operation. As mentioned above in connection with FIG. 1, our process also can be conducted in columns connected in series to attain extremely low (<0.1 ppm) chromate concentrations in the effluent of the final column.

We have established that regeneration in our process can be conducted satisfactorily with various alkaline aqueous solutions having a pH greater than 3 and containing regenerant ions in a concentration ranging from about 200 ppm (in the case of the makeup water of Table I) to about 150,000 ppm (as recommended in commercial chromate-recovery processes). In this regard, we have conducted various multicycle runs in which chromates were recovered from blowdown (Table I, above) in accordance with our invention, using a variety of regenerants. For these tests the resin bed was composed of IRA–400 and was 55 inches in height and 1 inch in diameter. As indicated in Table III, below, very low chromate leakage was obtained with the various regenerants listed. The use of chromate-exhausted blowdown as a secondary regenerant decreased chromate-elution times and reduced the total amount of acid required for pH adjustments of the makeup water. More costly chemical regenerants can be used, if desired, to further decrease elution time and reduce the total amount of regenerant required, good results being obtained with comparatively weak aqueous solutions thereof. Brine (NaCl) solution at a concentration as high as 5 percent and pH in the range of 4 to 8 is a particularly inexpensive chemical which can be used in place of chromate-depleted water as the secondary regenerant.

TABLE III

| Run | Regenerant (a= primary; b= secondary) | Initial Leak Rate During Subsequent Exhaustion Step (ppm $CrO_4^{-2}$) |
|---|---|---|
| I | (a) Makeup water (b) Chromate-exhausted blowdown | <0.1 |
| II | (a) Makeup water as sole regenerant | <0.1 |
| III | (a) Makeup water (b) pH adjusted makeup water | <0.1 |
| IV | (a) 4 percent NaOH (b) 4 percent NaCl | <0.1 |
| V | (a) Makeup water (b) 4 percent NaCl (pH 8) | <0.1 |

Using conventional process (strongly basic anion exchange resin, downflow exhaustion, upflow or downflow regeneration), we have been unable to recover chromate from blowdown (Table I) without incurring undesirably high chromate leakage rates upon initiation of an exhaustion cycle. This is illustrated by the data presented in FIG. 1. Using our processes as summarized in Table II, a bed of IRA-400 resin has been used repeatedly for more than 3,000 hours (25 complete cycles) with no loss of initial chromate-leakage control. In fact, chromate-leakage control seams to improve with use of the resin under conditions shown in Table II. This effect is illustrated in FIG. 2, which correlates chromate leakage and blowdown throughput for each of five successive exhaustion steps of the 3,000-hour test. A typical flow rate for these steps was 10 gpm/ft$^2$. Bed loading (lb. CrO$_4$/ft$^3$ resin) is shown for each exhaustion operation.

Our process can be conducted satisfactorily with various strongly basic anion-exchange resins, as previously described. Furthermore, it is not limited to the use of such resins, but can be conducted with weakly basic anion-exchange resins, such as Rohm & Haas IRA-93, if desired. The loading capacities of these latter resins are significantly lower than for the strongly basic resins; thus, other things equal, substantially greater volumes of the weakly basic resins are required.

Our process is applicable to the recovery of chromates from various waters containing the same. It is, however, especially advantageous for the recovery of chromate from blowdown waters because it permits efficient recovery with low chromate leakage, despite the presence of a comparatively high concentration of dissolved solids. This advantage is utilized in another form of our invention wherein a corrosion-free condition is maintained in industrial cooling systems of the kind previously described. In this form, our invention relates to treating the system cooling water with a suitable chromate-based corrosion inhibitor (e.g., sodium dichromate or another hexavalent chromium compound) to maintain a CrO$_4$ concentration therein in the range of 1–1,000 parts per million. The pH of the water preferably is maintained at a value in the range of 6.0 to 6.5. This system is monitored either continuously or intermittently to measure the buildup of dissolved solids, and when the buildup reaches a selected value, the system is blown down. The pH of the blowdown is adjusted to a value in the range of 3 to 5.5 (if the pH already is in this range, it is considered to have been pH-adjusted). Subsequently, the blowdown is passed upwardly through a strongly basic anion-exchange column, as described above, to extract the chromates and provide a discardable, essentially chromate-free effluent. The chromate retained on the bed is recovered by passing regenerants of the class described downwardly through the resin. The recovered chromate is recycled to the system, as required, for re-use as a corrosion inhibitor.

It will be understood that the above-mentioned scavenger (series-connected) column may, if desired, be operated in the improved mode disclosed herein. That is, the scavenger column may be operated with upflow exhaustion of the chromate from the water and downflow regeneration of the resin.

In a variety of chromate-recovery tests conducted in accordance with this invention we have found that the buildup of trivalent chromium on the resin is sufficiently small to have effect on process efficiency.

The foregoing description is presented for illustrative purposes, and our invention is not to be considered as limited except as required by the following claims.

We claim:

1. In a process wherein chromate ions are removed and recovered from pH-adjusted feedwater containing 1–1,000 ppm of chromates as CrO$_4$ and containing ions of other dissolved solids, said process including a first exhaustion step wherein said feedwater is passed through a bed of basic anion exchange resin to selectively remove said chromate ions from said feedwater and onto said resin, a subsequent regeneration step wherein an alkaline aqueous solution containing regenerant ions is passed through said bed to recover chromate ions from said bed, and a second exhaustion step wherein an additional amount of said feedwater is passed through said bed subsequent to said regeneration step, the variation of reducing initial leakage of chromate ions from said bed in said second exhaustion step comprising a. in said first exhaustion step and said second exhaustion step, passing said feedwater upwardly through said bed at a rate effecting expansion of said bed as a whole, thereby re-distributing resin particles thereof by gravitational settling and establishing from the bottom to the top of said bed a decreasing concentration gradient of chromate, and b. in said regeneration step, passing said alkaline aqueous solution downwardly through said bed to recover chromate ions therefrom.

2. The process of claim 1 wherein said anion-exchange resin is a strongly basic anion-exchange resin.

3. The process of claim 1 wherein the rate of upflow of said pH-adjusted water through said bed is maintained in the range of about 1 to 50 gal./min./ft$^2$ of cross-sectional area of said bed.

4. The process of claim 1 wherein regeneration is effected stepwise by passing said alkaline aqueous solution downwardly through said bed in a plurality of successive operations.

5. The process of claim 1 wherein regeneration with said alkaline aqueous solution is followed directly by a rinse step wherein an acidic solution at pH in the range of about −1 to 5.5 is fed downwardly through said bed essentially in an amount sufficient to satisfy the acid demand of said resin.

6. The process of claim 1 wherein said alkaline aqueous solution comprises essentially chromate-free water containing less than about 500 ppm dissolved solids and having a pH in the range of 9 to 11.

7. The process of claim 1 wherein the water passed upwardly through said bed of resin is passed through another bed of basic anion-exchange resin.

8. The method of claim 1 wherein said initial leakage of chromate ions is below 2 ppm.

9. The method of claim 1 wherein the concentration of said regenerant ions in said alkaline aqueous solution is between about 200 and 150,000 ppm.

10. An improved process for maintaining a recirculating-water system in a substantially corrosion-free condition, comprising:

a. treating said system with a chromate-based corrosion-inhibiting compound to maintain a chromate concentration in the range of about 1 to 1,000 ppm;

b. maintaining the pH within the range of about 6 to 6.5;

c. measuring the buildup of dissolved solids in said system as said system is operated;

d. withdrawing a part of said water from said system when said buildup reaches a selected value;

e. adjusting the pH of the withdrawn water to a value within the range of about 3 to 5.5;

f. passing the pH-adjusted withdrawn water upwardly through a bed of a strongly basic anion-exchange resin to selectively remove chromates therefrom and retain them on said resin to form an essentially chromate-free fraction, said pH-adjusted withdrawn water being passed upwardly at a rate effecting expansion of said bed as a whole, thereby re-distributing resin particles thereof by gravitational settling and establishing from the bottom to the top of said bed a decreasing concentration gradient of chromate;

g. discarding part of said essentially chromate-free fraction;

h. regenerating the chromate-retaining resin by passing downwardly through said bed an alkaline aqueous solution containing regenerant anions in a concentration between about 200 and 150,000 ppm;

i. collecting the chromate removed from the chromate-retaining resin by the regenerating solution; and j. returning the collected chromate to the system for re-use.

* * * * *